Patented July 7, 1931

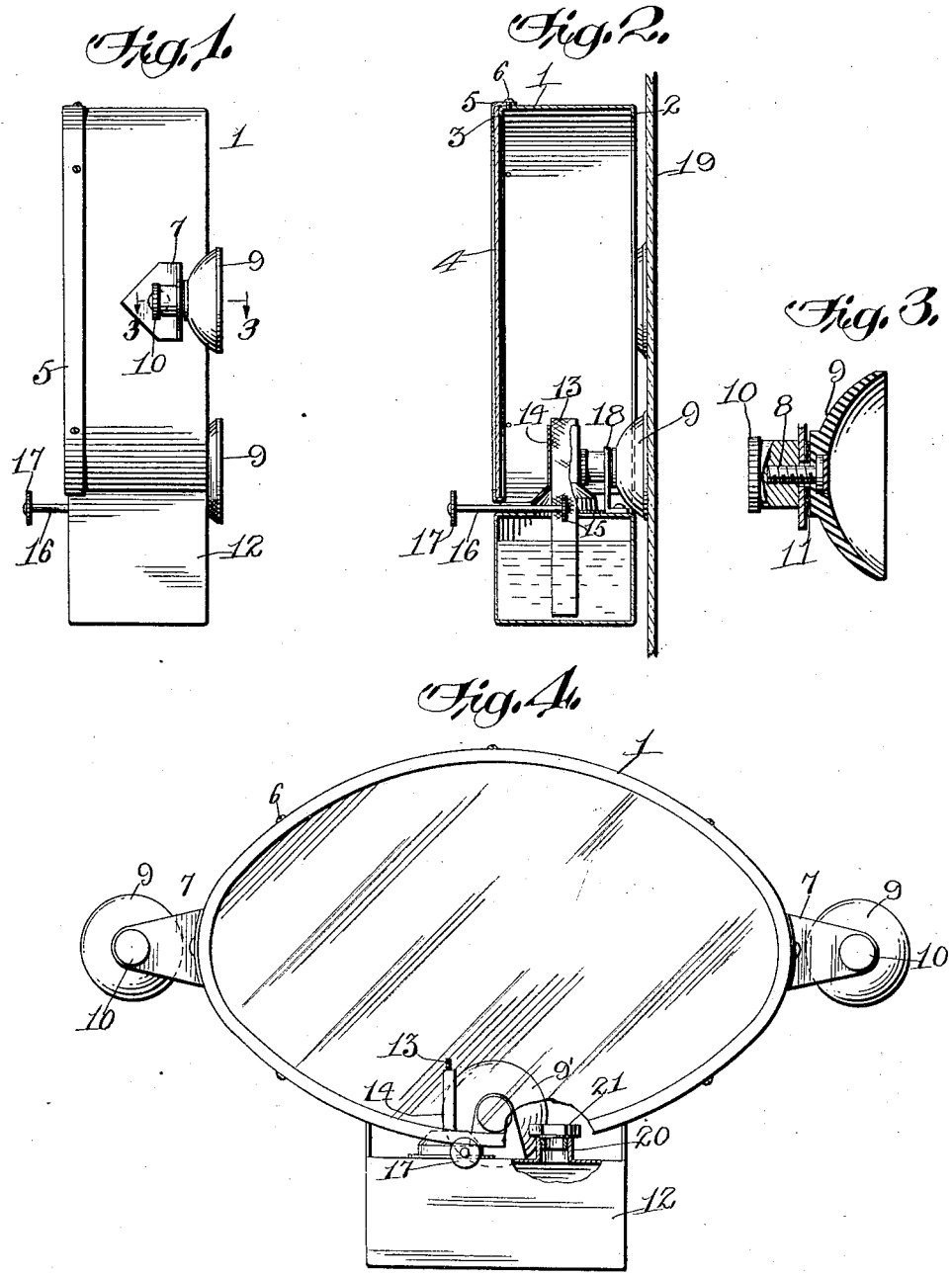

1,813,550

UNITED STATES PATENT OFFICE

EDWARD A. SMALL, OF FRANKSVILLE, WISCONSIN, ASSIGNOR TO EEJA AUTO ACCESSORIES COMPANY, OF FRANKSVILLE, WISCONSIN, A CORPORATION OF WISCONSIN

WINDSHIELD HEATER

Application filed May 13, 1929. Serial No. 362,842.

This invention relates to improvements in windshield heaters.

One of the objects of my invention is the provision of a novel type of heater adapted to be applied to a windshield, to keep the windshield from becoming frosted during cold weather and is so constructed and arranged that it can be quickly and readily applied to one face of the windshield, or removed therefrom.

Another object of the present invention is the provision of a windshield heater which is adapted to be applied to the windshield in front of the driver so as to keep the windshield in a comparatively heated condition during cold weather to prevent the glass of the windshield from becoming frosted so that the driver will always have a clear vision in front of him, and is so arranged that the heating member may be turned on and off at the will of the driver.

A further object of my invention is the provision of a comparatively similar device of the above character which can be quickly applied to the windshield in a position in front of the driver and when not in use can be readily removed, if so desired.

With the above and other objects in view, the invention consists in the novel features of construction, the combination and arrangement of parts hereinafter more fully set forth, pointed out in the claim and shown in the accompanying drawings wherein:

Figure 1 is a side elevation of a windshield heater constructed in accordance with my invention;

Figure 2 is a vertical sectional view;

Figure 3 is a detail section on the line 3—3 of Figure 1;

Figure 4 is a front elevation with parts thereof broken away and illustrated in cross section.

In carrying out the construction of my invention, I provide a body frame 1, which in the present instance is substantially oval-shaped as illustrated in Figure 4, the front edge of the frame being bent inwardly to form a flange 2 which presents a smooth unbroken face on the rear of the frame. The front edge of the frame is also bent inwardly to form a flange 3, and extending around the frame and positioned there against upon the outer side is a transparent panel 4. The panel 4 is retained in position by means of an angular plate 5, one side of which extends over onto the body frame 1 and is riveted or otherwise secured thereto, as shown at 6, while the other angle of the plate 5 extends over onto the edge of panel 4 and is arranged in opposed relation with the flange 3 for gripping the edges of the panel 4 to retain the same in position.

At each end of the frame 1, I provide angular brackets 7, one arm of each extending laterally over the ends of the body and provided with perforations adapted to receive the screw bolts 8 connected to the suction cups 9. A knurled face nut 10 is threaded onto each bolt 8 for clamping the suction cups to the arms 7. Positioned between the suction cups and the arms 7 are the washers 11 which may be of fabric or other suitable material.

Depending from the body frame 1 and preferably at the central portion thereof is a small tank 12 which is adapted to contain fuel oil for the wick 13, which extends up through the tubular guide 14, upon the interior of the tank 12. Arranged at the lower enlarged part of the guide 14 is a rotatable spur wheel 15, adapted to engage the wick 13 for raising and lowering the same in the guide. The spur wheel 15 is carried by a shaft 16 extending to the front part of the body frame 1 and is provided with a thumb wheel 17 for rotating the shaft to adjust the wick.

It will be noted that on the tank 12, I provide an angular bracket 18 carrying an additional vacuum cup 9' similar to the side cups 9. This third cup 9' is for the purpose of engaging the windshield 19 at a point below and midway of the two cups 9 in order to steady the frame member 1 and prevent jarring or chattering of the body frame, or shimmering of the light.

The tank 12 is also provided with a filling nipple 20 normally closed by means of a plug 21 whereby the supply of fuel in the tank may be replenished.

It will be apparent from the foregoing that when my improved device is applied to the inner side of the windshield and arranged in front of the driver, with the cups 9 and 9' fitted to the windshield, the wick 13 can be lighted for heating the chamber behind the panel 4. The heat from the wick 13 will have a tendency to keep the windshield 19 in a comparatively warm condition, thus preventing the frosting of the windshield, particularly that portion through which the driver must view the surface over which he is traveling.

While I have shown and described the body frame 1 as oval in form, it will be apparent that this frame can be made in various shapes and while I have described and illustrated the heating element as in the form of a wick, using coal oil, wood alcohol and the like, other suitable means may be provided for heating the chamber in front of the panel 4.

While I have shown and described the preferred embodiment of my invention, it will be apparent that slight changes may be made in the construction when putting the invention into practice without departing from the spirit of the same or the scope of the appended claim.

I claim:

A windshield heater comprising a substantially oval-shaped metallic frame of material width, an annular inturned flange at each side of said frame, a transverse panel at one side of said frame resting against the flange, an angular plate secured to the frame and having one flange thereof arranged in opposed relation to the flange on the frame, and engaging the panel to retain the same in position, angular brackets at the ends of the frame, suction cups carried by said brackets with their open mouth portions projecting beyond the open side of the frame, a fuel tank at the lower side of the frame intermediate the ends thereof, a heating element carried by the fuel tank and a suction cup carried by the fuel tank between the first mentioned suction cups with its open mouth portion projecting beyond the open side of the frame in alignment with the cups.

In testimony that I claim the foregoing I have hereunto set my hand at Franksville in the county of Racine and State of Wisconsin.

EDWARD A. SMALL.